United States Patent [19]

Sakamoto et al.

[11] Patent Number: 5,693,348
[45] Date of Patent: Dec. 2, 1997

[54] DISC MOLDING DIE

[75] Inventors: Yasuyoshi Sakamoto; Takehiko Kitamura; Akira Hatano, all of Chiba, Japan

[73] Assignees: Seikoh Giken Co., Ltd.; Sumitomo Heavy Industries, Ltd., both of Japan

[21] Appl. No.: 576,314

[22] Filed: Dec. 21, 1995

[30] Foreign Application Priority Data

Dec. 28, 1994 [JP] Japan .................. 6-328635

[51] Int. Cl.[6] .................. B29D 17/00; B29C 45/00
[52] U.S. Cl. .................. 425/436 R; 425/436 RM; 425/556; 425/810; 264/1.33; 264/107
[58] Field of Search .................. 425/436 R, 436 RM, 425/810, 556; 264/107, 334, 336, 304, 1.33

[56] References Cited

U.S. PATENT DOCUMENTS

| | | | |
|---|---|---|---|
| 2,132,501 | 10/1938 | Watkins | 264/304 |
| 2,132,502 | 10/1938 | Watkins | 264/304 |
| 4,956,141 | 9/1990 | Allen et al. | 264/297.2 |
| 5,116,551 | 5/1992 | Davidson et al. | 264/304 |
| 5,180,595 | 1/1993 | Kinoshita | 425/810 |
| 5,310,333 | 5/1994 | Sato et al. | 425/810 |
| 5,316,466 | 5/1994 | Tanaka et al. | 425/810 |
| 5,326,240 | 7/1994 | Kudo et al. | 425/810 |
| 5,427,520 | 6/1995 | Shimizu et al. | 425/810 |

FOREIGN PATENT DOCUMENTS

| | | | |
|---|---|---|---|
| 0010173 | 3/1981 | Japan | 264/304 |
| 0067242 | 6/1981 | Japan | 264/304 |

*Primary Examiner*—Jay H. Woo
*Assistant Examiner*—Minh-Chau T. Pham
*Attorney, Agent, or Firm*—Lorusso & Loud

[57] ABSTRACT

A disc molding die includes a stationary-side mirror block disposed on a stationary die, a movable-side mirror block disposed on a movable die and facing the stationary-side mirror block so as to define a cavity in combination with the stationary-side mirror block, and a cavity ring disposed on the radially outer side of one of the stationary-side mirror block and the movable-side mirror block so as to define the outer circumferential edge of each disc substrate. The portion of the cavity ring facing the cavity is roughened. When resin is charged into a cavity, very small spaces are formed between the resin and the inner circumferential surface of the cavity ring, due to the roughened portion of the cavity ring facing the cavity. Therefore, the release resistance during die opening or releasing can be decreased. As a result, it is possible to solve the conventional problem in which the disc substrate deforms, causing the angle of warp to vary at circumferential positions and increasing the amount of surface deflection. Therefore, the quality of the disc substrate can be increased. Further, since the release operation can be performed before a molded disc substrate sufficiently shrinks, tact time can be shortened.

3 Claims, 3 Drawing Sheets

DISC MOLDING DIE

BACKGROUND OF THE INVENTION

1. Field of the Invention

The present invention relates to a disc molding die.

2. Description of the Related Art

Conventionally, when a disc substrate is molded in an injection molding machine, resin supplied to a heating cylinder is heated and melted therein and then charged into a cavity formed in a disc molding die. The molten resin is then cooled and hardened to obtain a disc substrate.

The disc molding die is composed of a stationary die and a movable die. A die clamping apparatus causes the movable die to contact with and separate from the stationary die, thereby performing die closing, die clamping, and die opening.

The above-mentioned cavity is formed between a stationary-side mirror block disposed on the stationary die and a movable-side mirror block disposed on the movable die. A cavity ring is fixed to either the stationary-side mirror block or the movable-side mirror block so as to define the outer circumferential edge of each disc substrate.

Accordingly, when a disc substrate is released from the die after it is opened, release resistance is produced between the outer circumferential surface of the disc substrate and the inner circumferential surface of the cavity ring. In such a case, the disc substrate deforms so that the angle of warp varies at circumferential positions, and the amount of surface deflection increases, thereby deteriorating the quality of the disc substrate. Therefore, to reduce release resistance, each molded disc substrate is released after the disc substrate sufficiently shrinks by cooling. Alternatively, a relatively large draft is given to the inner circumferential surface of the cavity ring.

FIG. 1 is a sectional view of a main portion of a conventional disc molding die.

In this drawing, numeral 17 denotes a cavity, numeral 19 denotes a stationary-side mirror block, numeral 23 denotes a movable-side mirror block disposed facing the stationary-side mirror block 19, numeral 24 denotes a cutting punch, numeral 25 denotes a floating punch, numeral 53 denotes a stamper disposed on the stationary-side mirror block 19, and symbol P.L. denotes a parting line.

A cavity ring 51 is fixed surrounding the cavity 17 formed on the movable-side mirror block 23. The cavity ring 51 is provided with a restricting portion 55 which projects toward the stationary-side mirror block 19 so as to define the outer circumferential edge of an unillustrated disc substrate formed in the cavity 17. The inner circumferential surface S1 of the cavity ring 51 has a relatively large draft so as to decrease release resistance produced when a molded disc substrate is released. However, in the conventional disc molding die in which a molded disc substrate is released from the die after the molded disc substrate is cooled for sufficient shrinkage, the time for cooling must be long, and therefore, the tact time (cycle time) is prolonged, decreasing efficiency of manufacture.

Moreover, in the conventional disc molding die in which a relatively large draft is given to the inner circumferential surface S1 of the cavity ring 51, the relatively large draft imposes a restriction on the design of the disc substrate.

SUMMARY OF THE INVENTION

An object of the present invention is to solve the above-mentioned problems in the conventional disc molding dies and to provide a disc molding die which neither prolongs tact time nor imposes a restriction on the design of disc substrates.

To achieve the above object, the present invention provides a disc molding die which comprises a stationary-side mirror block disposed on a stationary die, a movable-side mirror block disposed on a movable die and facing the stationary-side mirror block so as to define a cavity in combination with the stationary-side mirror block, and a cavity ring disposed on the radially outer side of one of the stationary-side mirror block and the movable-side mirror block so as to define the outer circumferential edge of each disc substrate.

In this case, resin is charged into the cavity and cooled to form each disc substrate.

Also, a portion of the cavity ring facing the cavity is roughened.

In this case, very small spaces are formed between the resin and the inner circumferential surface of the cavity ring, so as to decrease release resistance during die opening or releasing.

As a result, it is possible to solve the conventional problem in which the disc substrate deforms, causing the angle of warp to vary at circumferential positions and increasing the amount of surface deflection. Therefore, the quality of disc substrates can be increased.

Further, since the release operation can be performed before a molded disc substrate sufficiently shrinks, tact time can be shortened.

According to another aspect of the present invention, the portion of the cavity ring facing the cavity extends perpendicular to a parting line.

In this case, since it is unnecessary to give a relatively large draft to the inner circumferential surface of the cavity ring, no restriction is imposed on the design of the disc substrate. This increases the degree of design freedom.

According to still another aspect of the present invention, the portion of the cavity ring facing the cavity has a roughness of 2–20 μm.

In this case, very small spaces are formed due to the roughness, so release-resistance during die opening or releasing can be decreased.

BRIEF DESCRIPTION OF THE DRAWINGS

The structure and features of the disc molding die according to the present invention will be readily appreciated as the same becomes better understood by referring to the drawings, in which.

DESCRIPTION OF PREFERRED EMBODIMENTS

Embodiments of the present invention will next be described in detail with reference to the drawings.

Figure 1:
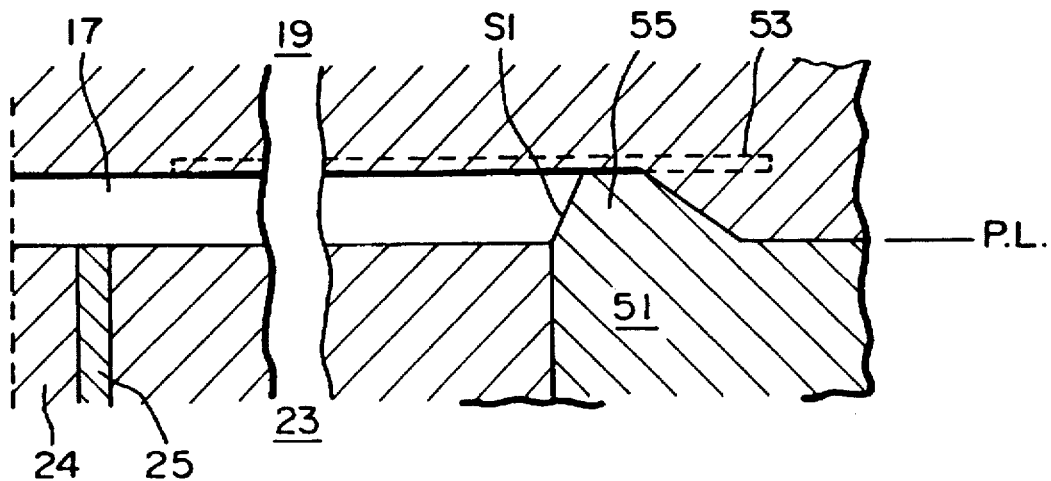
FIG. 1 is a sectional view of a main portion of a conventional disc molding die.
Figure 2:
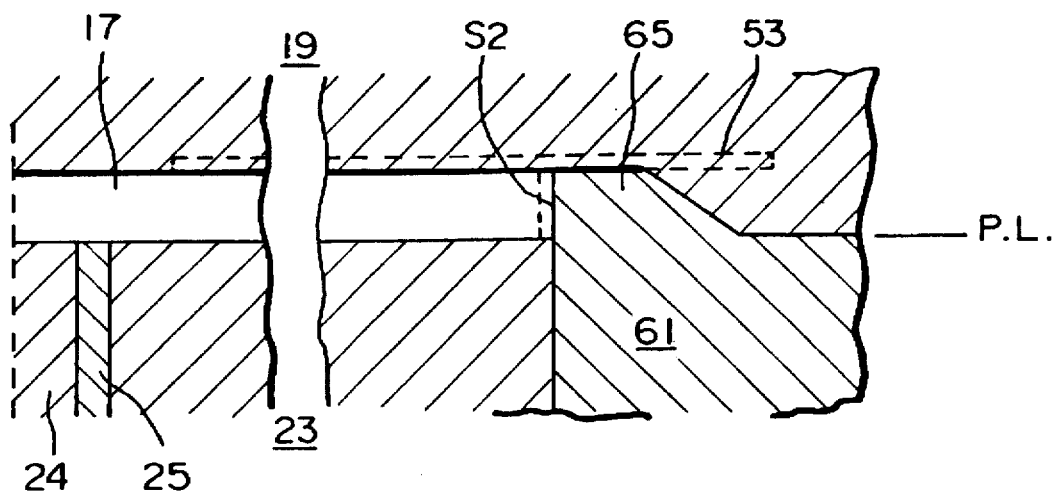
FIG. 2 is a sectional view of a main portion of a disc molding die according to the first embodiment of the present invention.
Figure 3:
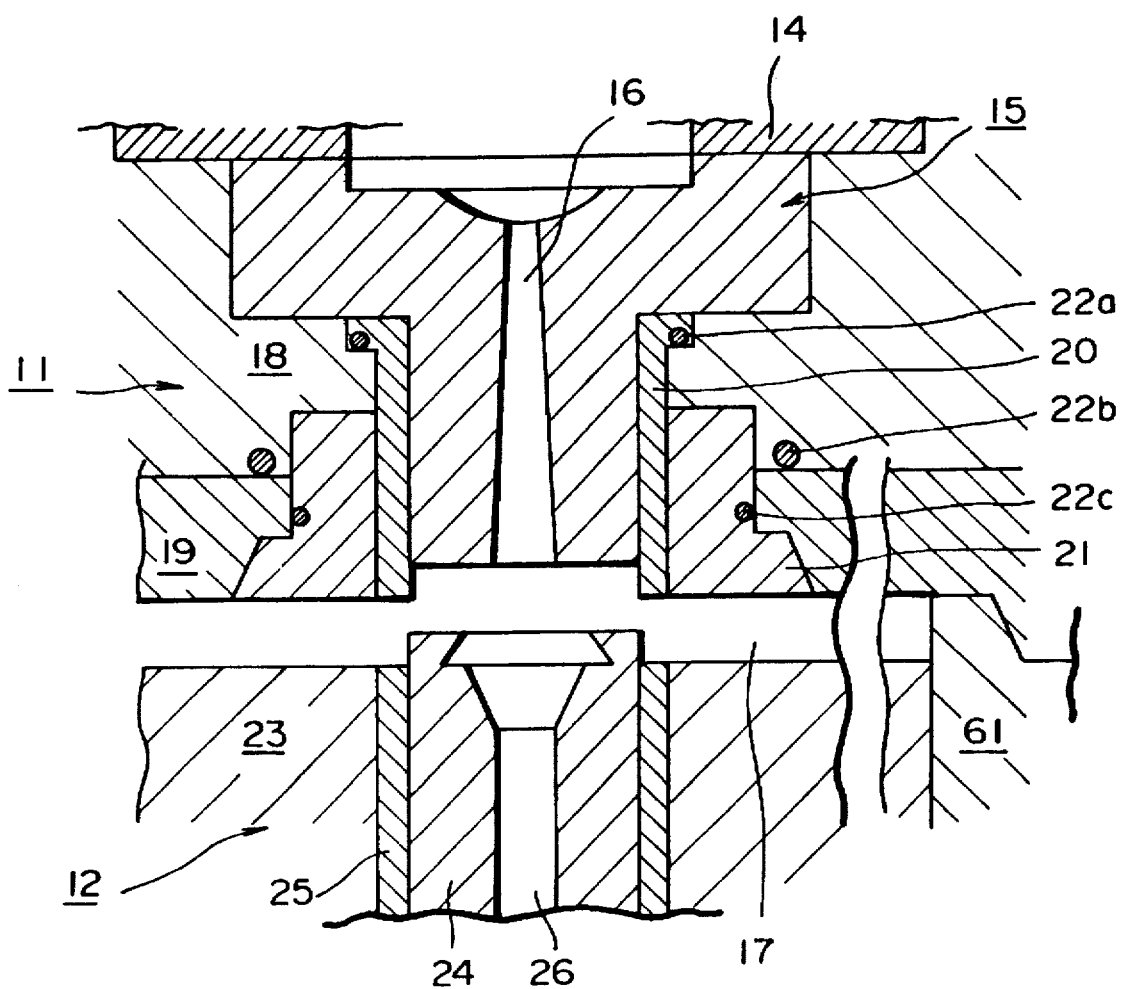
FIG. 3 is a sectional view of the disc molding die according to the first embodiment of the present invention.

FIG. 2 is a sectional view of a main portion of a disc molding die according to the first embodiment of the present invention, and FIG. 3 is a sectional view of the disc molding die according to the first embodiment of the present invention.

In these drawings, numeral 11 denotes a stationary die, and numeral 12 denotes a movable die disposed facing the stationary die 11 and caused to contact with and separate from the stationary die 11. The stationary die 11 and the movable die 12 constitute a disc molding die. Numeral 14 denotes a locating ring, numeral 15 denotes a sprue bushing having a sprue 16 at the center thereof, and numeral 17 denotes a cavity. Resin injected from an unillustrated injection nozzle which is contacted to the sprue bushing 15 passes through the sprue 16 and enters the cavity 17 so that the cavity 17 is filled with the resin. The resin hardened in the cavity 17 becomes a disc substrate, which is a desired mold product.

Numeral 18 denotes a stationary-side base plate, numeral 19 denotes a stationary-side mirror block attached to the stationary-side base plate 18, numeral 20 denotes a stationary-side bushing which has a sleeve-like shape and is disposed surrounding the sprue bushing 15, numeral 21 denotes an inner stamper holder which has a sleeve-like shape and is disposed surrounding the stationary-side bushing 20, and numeral 53 denotes a stamper disposed on the stationary-side mirror block 19.

An O-ring 22a is disposed between the stationary-side base plate 18 and the stationary-side bushing 20 for sealing therebetween, an O-ring 22b is disposed between the stationary-side base plate 18 and the stationary-side mirror block 19 for sealing therebetween, and an O-ring 22c is disposed between the stationary-side mirror block 19 and the inner stamper holder 21 for sealing therebetween.

Numeral 23 denotes a movable-side mirror block which is attached to an unillustrated movable-side base plate and which forms the cavity 17 in combination with the stationary-side mirror block 19, numeral 61 denotes an annular cavity ring which is fixed on the radially outer side of the movable-side mirror block 23 and numeral 24 denotes a cutting punch which is disposed so as to advance and retract with respect to the movable-side mirror block 23.

The cavity ring 61 is provided with a restricting portion 65 which projects toward the stationary-side mirror block 19 as to define the outer circumferential edge of each disc substrate formed in the cavity 17. The inner circumferential surface S2 of the cavity ring 61 is formed such that it extends perpendicular to a parting line P.L.

If necessary, a draft can be given to the inner circumferential surface S2 of the cavity ring 61 to such an extent that the draft imposes no restriction on the design of the disc substrate.

The cutting punch 24 is advanced after resin is charged into the cavity 17 during the molding operation so as to form a hole in each disc substrate. Numeral 25 denotes a floating punch disposed surrounding the cutting punch 24, and numeral 26 denotes a sprue pin which is provided at the center of the cutting punch 24 and which is advanced and retracted with respect to the cutting punch 24. The sprue pin 26 is advanced and retracted by an unillustrated ejector mechanism. When the sprue pin 26 is advanced, it pushes out a sprue portion.

When a release operation is performed after the die is opened, the floating punch 25 is advanced so as to push out a molded disc substrate for separation from the die. At this time, release resistance is produced between the outer circumferential surface of the disc substrate and the inner circumferential surface S2 of the cavity ring 61. To decrease such release resistance, the portion of the inner circumferential surface S2 of the cavity ring 61 facing the cavity 17 is roughened so that the inner circumferential surface S2 has a roughness of 2–20 μm.

In this case, when resin is charged into the cavity 17, very small spaces are formed, due to the above-mentioned roughness, between the resin and the inner circumferential surface S2 of the cavity ring 61. Accordingly, it is possible to decrease release resistance at the time when a disc substrate is pushed out by the floating punch 25. As a result, it becomes possible to solve the conventional problem in which the disc substrate deforms, causing the angle of warp to vary at circumferential positions and increasing the amount of surface deflection. Therefore, the quality of the disc substrate can be increased.

Since release operation can be performed before a molded disc substrate sufficiently shrinks, tact time can be shortened. Further, since it is unnecessary to give a relatively large draft to the inner circumferential surface S2 of the cavity ring 61, no restriction imposed on the design of the disc substrate, so that the degree of design freedom is increased.

In the present embodiment, only the portion of the inner circumferential surface S2 facing the cavity 17 is roughed. However, the inner circumferential surface S2 may be entirely Next, the second embodiment of the present invention will be described.

Figure 4:
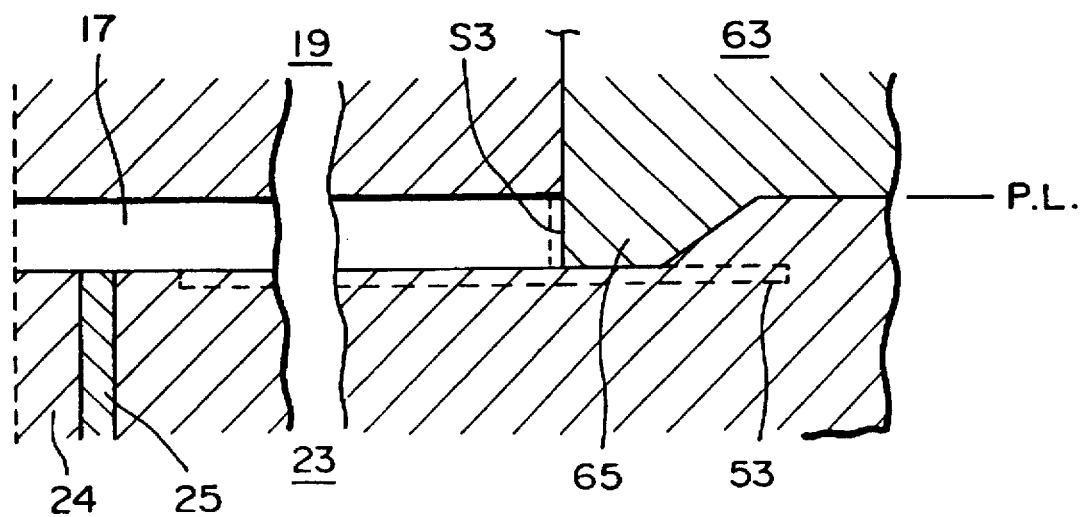
FIG. 4 is a sectional view of a main portion of a disc molding die according to the second embodiment of the present invention.

FIG. 4 is a sectional view of a main portion of a disc molding die according to the second embodiment of the present invention.

In FIG. 4, numeral 17 denotes a cavity, numeral 19 denotes a stationary-side mirror block, numeral 23 denotes a movable-side mirror block disposed facing the stationary-side mirror block 19, numeral 24 denotes a cutting punch numeral 25 denotes a floating punch, numeral 53 denotes a stamper fixed to the movable-side mirror block 23, and symbol P.L. denotes a parting line.

A cavity ring 63 is fixed surrounding the cavity 17 formed under the stationary-side mirror block 19. The cavity ring 63 is provided with a restricting portion 65 which projects toward the movable-side mirror block 23 so as to define the outer circumferential edge of each disc substrate formed in the cavity 17. To decrease release resistance generated when a molded disc substrate is released, a portion of the inner circumferential surface S3 of the cavity ring 63 facing the cavity 17 is roughened.

In this case, it becomes possible to decrease release resistance at the time when a disc substrate is left on the movable die during die opening.

In the present embodiment, only the portion of the inner circumferential surface S3 facing the cavity 17 is roughened. However, the inner circumferential surface S3 may be entirely roughened.

The present invention is not limited to the above-described embodiments. Numerous modifications and variations of the present invention are possible in light of the spirit of the present invention, and they are not excluded from the scope of the present invention.

What is claimed is:

1. A disc molding die comprising:

(a) a stationary-side mirror block disposed on a stationary die and presenting a stationary mold surface;

(b) a movable-side mirror block presenting a movable mold surface facing said stationary mold surface and mounted on a movable die for movement between a die-closed position defining a die cavity in combination with said stationary-side mirror block and a die-open position; and (c) a cavity ring disposed fixed to and surrounding one of said stationary-side mirror block and said movable-side mirror block, said cavity ring having a restricting portion surrounding and protruding from the mold surface of said one block so as to define a circumferential surface for the die cavity in said die-closed position, at least a portion of said circumferential surface, along which a molded disc travels upon release from the die cavity, being roughened to an extent enhancing release of the molded disc therefrom.

2. A disc molding die according to claim 1, wherein a surface portion of said cavity ring mates with the mold surface of the other die in the die-closed position to define a parting line therebetween and wherein said circumferential surface is perpendicular to said parting line.

3. A disc molding die according to claim 1, in which said circumferential surface has a roughness of 2–20 µm.

* * * * *

UNITED STATES PATENT AND TRADEMARK OFFICE
CERTIFICATE OF CORRECTION

PATENT NO. :  5,693,348
DATED      :  December 2, 1997
INVENTOR(S):  SAKAMOTO et al It is certified that error appears in the above-indentified patent and that said Letters Patent is hereby corrected as shown below:

Col. 4, line 29, after "entirely" insert --roughed.--

Signed and Sealed this

Sixth Day of October, 1998

Attest:

BRUCE LEHMAN

Attesting Officer

Commissioner of Patents and Trademarks